(No Model.)

J. C. SLAUGHTER.
EXTRACTOR FOR COFFEE POTS.

No. 383,831. Patented May 29, 1888.

WITNESSES:
R. L. Clemmitt.
John E. Morris.

INVENTOR:
J. C. Slaughter
BY Chas. B. Mann,
ATTORNEY.

UNITED STATES PATENT OFFICE.

JOEL C. SLAUGHTER, OF ST. LOUIS, MISSOURI, ASSIGNOR OF ONE-HALF TO LOUIS HELM, OF SAME PLACE.

EXTRACTOR FOR COFFEE-POTS.

SPECIFICATION forming part of Letters Patent No. 383,831, dated May 29, 1888.

Application filed December 8, 1887. Serial No. 257,318. (No model.)

*To all whom it may concern:*

Be it known that I, JOEL C. SLAUGHTER, a citizen of the United States, residing at St. Louis, in the State of Missouri, have invented certain new and useful Improvements in Extractors for Coffee-Pots, of which the following is a specification.

My invention relates to an improvement in coffee-pots, the object being to facilitate the extraction of the flavor of the coffee, and is illustrated in the accompanying drawings, in which—

Figure 1:
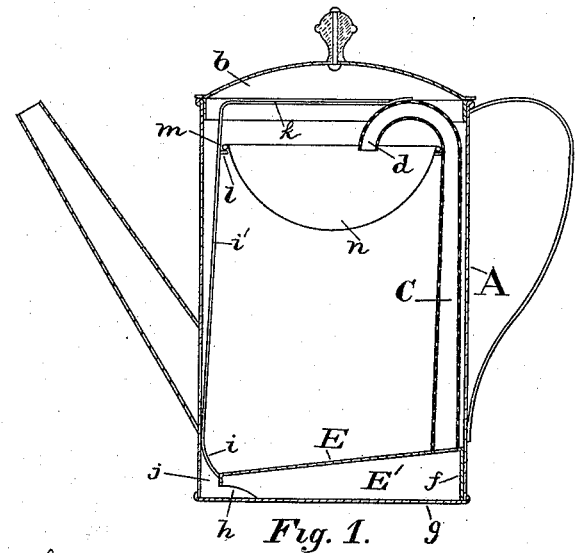
Figure 2:
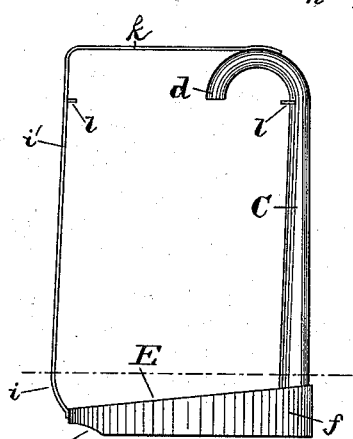
Figure 3:
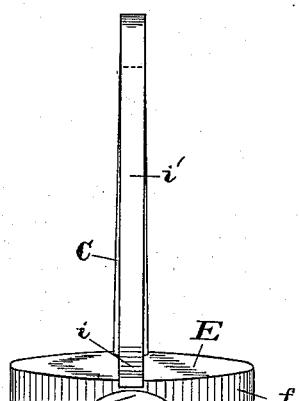
Figures 4, 5:
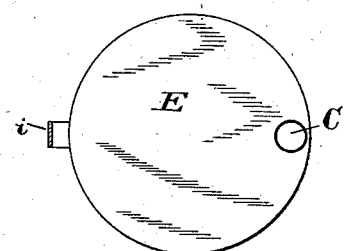

Figure 1 is a vertical section of the coffee-pot. Figs. 2 and 3 are side views, the one showing a transverse side from the other. Fig. 4 is a plan of the false bottom. Fig. 5 is a view of the wire ring which is attached to the strainer-bag.

The wall A of the coffee-pot vessel is vertical, and a cover, b, fits close on top. A stand-pipe, C, has at the top a goose-neck nozzle, d, and at its lower end passes through and is secured to the high side of a sloping false bottom, E, of circular shape. The said circular false bottom has a rim or downflange, f, which rests on the bottom, g, of the pot or vessel A.

It will be seen the false bottom is highest at the side where the stand-pipe C is attached, and is lowest at the diametrically-opposite side. The top surface of this false bottom is flat and slopes from the high to the low side. This false bottom forms a bottomless chamber, E'. The rim or downflange f is provided at its lowest side with an inlet or opening, h, to allow water in the vessel A to enter the chamber E'. This extractor, comprising the false bottom with flat sloping top, stand-pipe C at the high side, and inlet h at the lowest side, insures the best results in causing the boiling water confined in the chamber E' to rise in the stand-pipe and discharge at the nozzle d. Where the chamber in this class of devices has a level or horizontal top, the boiling water is as likely to force its way back out of the inlet as to rise in the stand-pipe. An upward-projecting plate-spring, i, is attached to the side of the false bottom where the inlet h is located. This spring i curves outward beyond the circle described by the rim or down flange f, and thereby comes in contact with the inner surface of the wall A of the vessel, and serves to keep the inlet side of the false bottom away from the said wall A, and thus insures that a space, j, will be left between the downflange f, where the inlet h is, and the wall of the vessel, whereby the boiling water in the said vessel will readily have access to the inlet h, leading to the chamber E'. In the present instance this upward-projecting spring i is continued up to near the top of the pot, and serves as a standard, i', to support the strainer-bag, and at a point of equal altitude with the top of the goose neck nozzle d the standard terminates, and a cross-bar, k, connects the said standard with the stand-pipe, or with the said goose neck. This cross-bar k serves as a handle by which to lift the stand-pipe and false bottom.

The stand-pipe C and the standard i are each provided near the top with a lug, l, to support the wire ring m, to which the strainer-bag n is attached. This bag is to contain the ground coffee, and may be removed and replaced in position very readily. Instead of a bag, a wire-gauze receptacle of any kind may be used.

To operate the coffee-extractor, place the ground coffee in the receptacle n, and put into the vessel A as much water as desired. Then place the pot or vessel on the hot stove. When the water in the bottom chamber, E', boils, it will rise in the stand-pipe and flow out of the nozzle onto the ground coffee, and filter or percolate through it and extract the flavor. This operation will continue as long as the water is kept boiling.

Having described my invention, I claim and desire to secure by Letters Patent of the United States—

The herein-described extractor for coffee-pots, comprising the false bottom E, having a flat sloping top and a downflange, f, provided at its lowest side with an inlet, h, an upward-projecting spring, i, attached to the false bottom where the inlet is located, and curved outward beyond the said downflange, a stand-pipe, C, having a goose neck nozzle, d, and its lower end passing through the high side of the false bottom diametrically opposite the said inlet, and a ground-coffee receptacle supported below said nozzle.

In testimony whereof I affix my signature in the presence of two witnesses.

JOEL C. SLAUGHTER.

Witnesses:
 M. J. HALLORAN,
 B. FILIPPI.